United States Patent
De La Torre-Bueno

(10) Patent No.: US 8,295,562 B2
(45) Date of Patent: Oct. 23, 2012

(54) MEDICAL IMAGE MODIFICATION TO SIMULATE CHARACTERISTICS

(75) Inventor: Jose De La Torre-Bueno, Vista, CA (US)

(73) Assignee: Carl Zeiss MicroImaging AIS, Inc., Jena (DE)

( * ) Notice: Subject to any disclaimer, the term of this patent is extended or adjusted under 35 U.S.C. 154(b) by 1631 days.

(21) Appl. No.: 11/622,433

(22) Filed: Jan. 11, 2007

(65) Prior Publication Data

US 2007/0165929 A1    Jul. 19, 2007

Related U.S. Application Data

(60) Provisional application No. 60/759,102, filed on Jan. 13, 2006.

(51) Int. Cl.
*G06K 9/00* (2006.01)
(52) U.S. Cl. ........................................ 382/128
(58) Field of Classification Search ............ 382/133, 382/134, 163, 164, 167, 169, 255, 274, 275, 382/279
See application file for complete search history.

(56) References Cited

U.S. PATENT DOCUMENTS

| | | | | |
|---|---|---|---|---|
| 5,457,491 A * | 10/1995 | Mowry | ...................... | 348/104 |
| 6,512,841 B2 * | 1/2003 | Yamada et al. | .............. | 382/128 |
| 6,590,612 B1 * | 7/2003 | Rosenqvist et al. | .......... | 348/349 |
| 6,633,657 B1 * | 10/2003 | Kump et al. | .................. | 382/128 |
| 6,930,773 B2 * | 8/2005 | Cronin et al. | ................. | 356/300 |
| 7,133,547 B2 * | 11/2006 | Marcelpoil et al. | ........... | 382/129 |
| 7,324,702 B2 * | 1/2008 | Takano et al. | ................. | 382/274 |
| 7,646,905 B2 * | 1/2010 | Guittet et al. | ................. | 382/133 |
| 7,728,883 B2 * | 6/2010 | Hsu | ............................ | 348/223.1 |
| 7,792,378 B2 * | 9/2010 | Liege et al. | .................... | 382/254 |
| 7,979,212 B2 * | 7/2011 | Gholap et al. | .................. | 702/19 |
| 8,008,522 B2 * | 8/2011 | Lukhtanov et al. | ........... | 558/204 |
| 2005/0037406 A1 * | 2/2005 | De La Torre-Bueno et al. | . | 435/6 |

* cited by examiner

*Primary Examiner* — Vikkram Bali

(74) *Attorney, Agent, or Firm* — Patterson Thuente Christensen Pedersen, P.A.

(57) ABSTRACT

A system of compensating a medical image to make it look like it came from either a different camera or from using a different dye or stain. The medical image is obtained and then processed using characteristics of the non-image related parts of the image. These non-image related parts can include the dye that was used to dye the image or the camera that was used to obtain the image. Then, the raw or partially raw image can be reprocessed using characteristics of the different non-image related part. For example, in one embodiment, the image is deconvolved to remove the influence of the camera that actually obtained the image, then reconvolved with information indicative of a different camera. In this way, the image is processed to make it look like it came from a different camera than the one that actually did in fact form it.

25 Claims, 1 Drawing Sheet

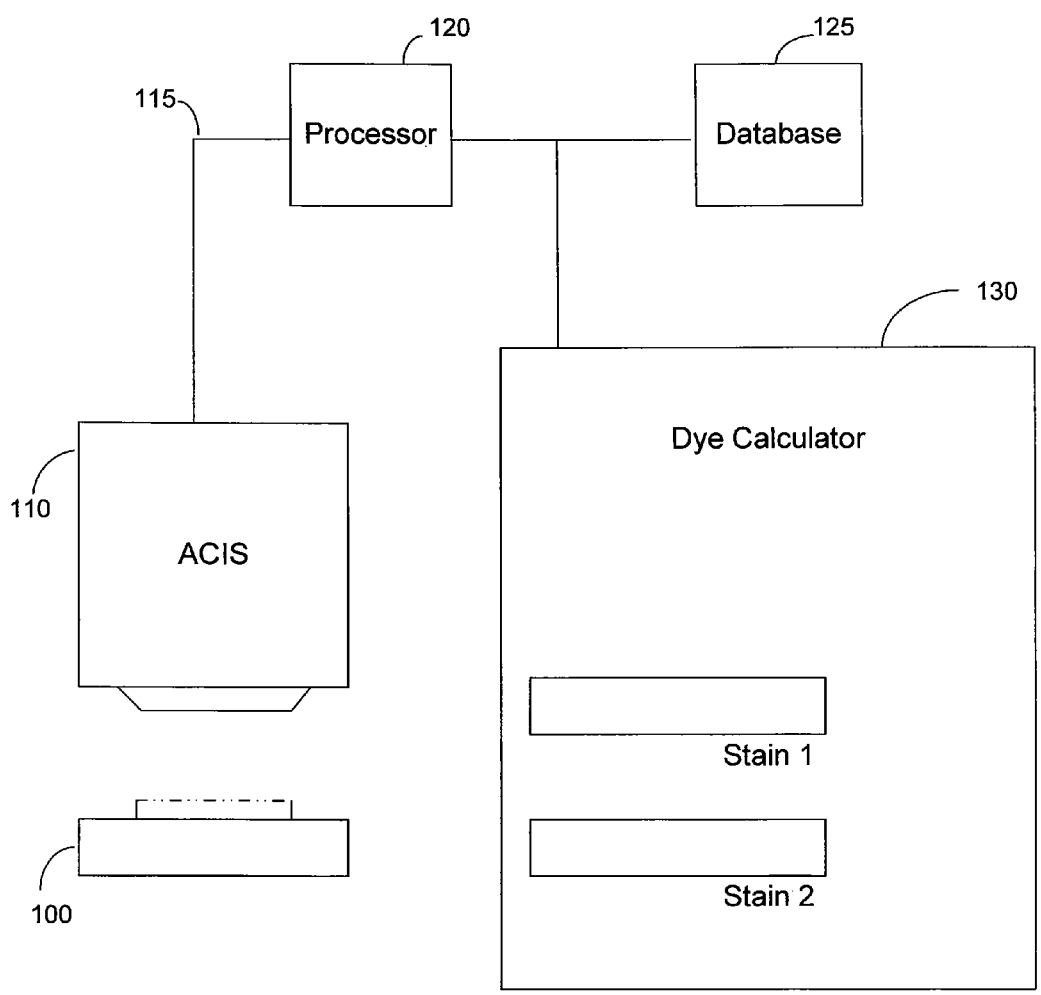

MEDICAL IMAGE MODIFICATION TO SIMULATE CHARACTERISTICS

CROSS-REFERENCE TO RELATED APPLICATIONS

This application claims priority to U.S. Provisional Application 60/759,102, filed Jan. 13, 2006. The disclosure of the prior application is considered part of (and is incorporated by reference in) the disclosure of this application.

BACKGROUND

Computers have been used to analyze stained samples of biological specimens. The use of such systems may allow automated image analysis of the biological specimen. A stained biological specimen is analyzed to determine the shape of the envelope of a curve that represents intensity as a function of wavelengths. The shape of the envelope is characteristic of the dye in question.

Stained images are often analyzed by pathologists or other medical professionals. These professionals often have certain preferences about the way they like these images to look. Because of these preferences, some professionals will insist on certain kinds of hardware, just because that hardware provides an image with a familiar look.

SUMMARY

The present application describes mathematical analysis and manipulation of images which allows changing image characteristics of a medical dyed image which is obtained, without actually changing the hardware and/or the dye.

One aspect describes determining dye characteristics within a composite image which may have multiple different dyes.

BRIEF DESCRIPTION OF THE DRAWINGS

The FIGURE shows a block diagram of an embodiment of the invention including an imaging system, a processor, a database, and a dye calculator.

DETAILED DESCRIPTION

A medical image, e.g., a dye-stained image, may be obtained from various sources. One such source is the ChromaVision Automated Cellular Imaging System, or ACIS. The image may be an analog or digital representation of the result of the scanning of a medical part.

The shape of the envelope of a specific dye has a characteristic envelope when viewed on an intensity vs wavelength plot. When multiple dyes are present, the intensity versus wavelength curve will arithmetically combine and create a combined spectrum. The combined spectrum is basically uninterpretable to the human eye. However, it is possible to mathematically solve for the amount of each dye is included in that envelope. This detection may use, for example, a combination of the different peaks from the different dyes to form a multiple wavelength, multiple dye, multi-unknown equation. Off-the-shelf software can be used to analyze the different dyes and their components, based on certain measurements, e.g., the complete spectrum, or selected bands of the spectrum.

The operation may use any conventional camera, such as the camera and software available from the company CRI. Many different kinds of stains may be used. For example, the H&E stain is one common stain, and is often the first stain that is used. Other special stains may be subsequently used. Often the operation proceeds by a professional looking at the results of the H&E stain, and deciding what other stains are needed after reviewing the H&E stain.

Multiplex staining is also known, e.g. the staining by the company Dako, who uses a multiplex stain that is formed of a combination of multiple different targeted stains. Each of the targeted stains is used for a particular clinical purpose. The Dako system provides a collection of images, each showing the result of a specific dye. For example, one of the images may show a specific dye for a specific cell part such as the nucleus. Another of the images may provide a cell part for the membrane. The dyes may be combined in different ways. It can provide a set of images such as done by CRI. Images can be provided from a three color camera. Other techniques may also be used to produce medical images in similar or dissimilar ways.

Another issue is caused by the prejudices of certain pathologists. For example, some pathologists may like to see things in a certain way, e.g., the way they are accustomed to seeing them. This may be based on the specific hardware that they used in the past. From this, it has been recognized by the present inventors that it may be desirable to convert backwards from the concentration map produced by a camera, to a previous concentration map showing how a dye or specific information would have looked on different hardware or with different characteristic information.

The FIGURE illustrates an embodiment, where the medical item being imaged, e.g. 100, may be a slide which is dyed in an appropriate way. The medical item 100 is imaged by any kind of camera or microscope, here the chromavision ACIS 110. The output 115 of the ACIS 110 represents the image acquired by the ACIS which is processed by a processor 120 as described herein.

The processor processes the image taking into account image characteristics. Specifically, the image data which is obtained as 115 is shown as I, where $$I = R * H * D \quad (1)$$

where R is a hypothetical raw image, that is the image assuming that the camera had no characteristics whatsoever. The values H and D are values that contribute to the image, but are not part of the image obtained from the medical sample. These values are referred to herein as being non image related components. The raw image value R is mathematically modified by the value "H", which may be a vector or complex variable representing the convolution characteristics of the hardware obtaining the image, and further mathematically modified by the value D which represents the dyes that are used in the image.

Hence, as equation 1 demonstrates, the information indicative of the raw image is convolved with an acceptance curve of the camera to form a final image. The database 125 stores a plurality of alternative convolution characteristics H1, H2, H3, etc, for other known cameras and/or other hardware. Processor 120 can deconvolve the information I, to obtain the decompensated information R*D, representing only the raw image and the dye. Then, processor 120 can reconvolve that value R*D with a different camera hardware characteristics, e.g., H1. In this way, the display can be changed to represent the way that the slide would have looked if obtained by different cameras.

In this way, when pathologists have specified preferences, those preferences can be determined mathematically and can be displayed to the pathologist based on the mathematical convolution. Characteristics of any camera or any other hardware can be mathematically determined. Darker stains can be shown, as well as how these darker stains would have looked using any specific camera whose convolution characteristic can be determined.

Also, the way the image would have looked to a three color camera or any other kind of camera, can be determined and/or displayed.

Since the system models the operation as a mathematical equation, the characteristics of the dye can also be changed. Database 125 can store mathematical information regarding the dye characteristics. A similar deconvolution of the dye can be carried out—where the dye is deconvolved from the image I, and then a new dye or dyes can be substituted. Any different kind of dye can be used. For example, the characteristics of the dye can be changed from an absorption style dye to a reflection style dye. Alternatively, different species of dyes with different dye characteristics can be obtained. Hypothetical dyes can also be mixed to form a new hypothetical composite dye.

The image can also be treated as a set of concentration maps, allowing every pixel to be modified in any desired way. For example, the way that any pixel or pixel group would have looked if another dye was used, can be substituted for the way the image actually looked. Dye darkness can be modified in this way. Any of these can be convolved with a different camera, or it can be shown without convolution.

Following this technique, the fundamental raw image can be changed to convey the same information with a different look. Interaction between the fundamental data and the preference of the viewer is used to convey any desired information. It should be understood, however, that this system can only change the coloration or other similar characteristic of the image. For example, while this system can change the image to look like it were stained with another dye, all of the staining information would be the same as that obtained with the original dye. For example, if stain x preferentially stains organelles a, then all of the different dye simulations done by the present system will similarly preferentially stain organelle a. The coloration, hue, and other characteristics will be changed, but the dye characteristics will not.

According to another aspect, a custom dye calculator is provided as 130. The dye calculator provides a slider for each stain, allowing that stain to appear or disappear, and to be mixed in any desired way between the appearance and disappearance. This allows changing the stain for darkness, changing the apparent color of the stain, and the like. It also enables mathematically correcting any aspect of the image, derived from the concentration. These values may be saved, and used as a saved setting for an individual pathologist.

The computers described herein may be any kind of computer, either general purpose, or some specific purpose computer such as a workstation. The computer may be a Pentium class computer, running Windows XP or Linux, or may be a MacIntosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Although only a few embodiments have been disclosed in detail above, other embodiments are possible and the inventor intends these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, other characteristics can analogously be changed using this system.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
   obtaining a medical image that represents an image of a medical sample;
   first processing said medical image to remove an influence of at least one image-contributing component to form a deconvolved image, wherein said image contributing component is indicative of a dye which is used to dye the medical sample; and
   second processing said deconvolved image to form a compensated image, including changing the at least one image contributing component to a different image contributing component; and
   displaying the compensated image.

2. A method as in claim 1, wherein said image contributing component includes characteristics of hardware which is used to obtain the image.

3. A method as in claim 2, further comprising storing characteristics of a plurality of different hardware characteristics of hardware devices that can be used to obtain an image.

4. A method as in claim 3, wherein said first processing further comprises changing the medical image to a partially raw image that removes characteristics of hardware originally used to obtain the image, and wherein said second processing said raw image further comprises processing using one of said stored characteristics of hardware.

5. A method as in claim 3, wherein said characteristics of hardware that are stored represent different specific types of cameras.

6. A method as in claim 1, wherein said image contributing component includes both characteristics of hardware which is used to obtain the image, and the dye which is used to dye the medical sample.

7. A method as in claim 1, further comprising storing a plurality of different dye characteristics respectively representative of dyes that are used to dye the medical sample.

8. A method as in claim 7, wherein said first processing further comprises changing the medical image to a partially raw image by removing a characteristic of a dye that was used in obtaining the image, and wherein said second processing further comprises processing using one of said stored dye characteristics.

9. A method as in claim 1, wherein said first processing and second processing comprises changing characteristics of the dye between an absorption style dye and a reflection style dye.

10. A method as in claim 1, further comprising a slider control, that allows controlling an amount of dye to be added to the image.

11. A method as in claim 10, further comprising, when said slider control is moved, changing an amount of coloration to the image based on the moving of said slider control.

12. A method, comprising:
   obtaining a medical image using first image obtaining hardware;
   compensating said medical image to form a compensated medical image, that makes said medical image appear as if it were obtained using second image obtaining hardware, different than the first image obtaining hardware;

further compensating said medical image to make said medical image appear as if it were obtained using a specified dye;

wherein said further compensating comprises obtaining information indicative of a dye that was used to stain the medical image, using said information to form a partially raw medical image that has influence from the dye removed, and subsequently compensating said medical image based on information indicative of a second dye.

13. A method as in claim 12, further comprising displaying the compensated medical image.

14. A method as in claim 13, wherein said compensating comprises obtaining information indicative of said first image obtaining hardware, and using said information with said medical image to form a partially raw medical image that removes influences from said first image obtaining hardware, and subsequently using information indicative of said second image obtaining hardware to change the partially raw medical image.

15. A method as in claim 12, wherein said further compensating comprises obtaining information indicative of a second dye, and compensating said medical image using said information.

16. A medical imaging device, comprising:
a computer that receives information indicative of a medical image that represents an image of a medical sample, and wherein the medical image includes information indicative of a non-image-related image contributing component, first processes said medical image to remove an influence of at least one image-contributing component to form a deconvolved image and again processes said deconvolved image to form a compensated image, including changing the at least one image contributing component to a different image contributing component; and wherein said image contributing component is indicative of a dye which is used to dye the medical sample.

17. A device as in claim 16, further comprising an image obtaining part that obtains the medical image.

18. A device as in claim 17, wherein said image obtaining part is a camera.

19. A device as in claim 17, wherein said image obtaining part is a microscope.

20. A device as in claim 17, wherein said image contributing component includes characteristics of the image obtaining part.

21. A device as in claim 17, further comprising a memory that stores characteristics of a plurality of different image obtaining parts that can be used to obtain an image.

22. A device as in claim 21, wherein said first processes comprises changing the medical image to a partially raw image that removes characteristics of hardware originally used to obtain the image, and said again processes comprises compensating said raw image using one of said stored hardware characteristics.

23. A device as in claim 16, further comprising a display that displays the compensated image.

24. A device as in claim 23, wherein said display shows a slider control, that allows sliding between one of plural positions, to control an amount of dye to be added to the image.

25. A device as in claim 24, wherein said processor compensates the image to change an amount of coloration to the image based on the moving of said slider control.

* * * * *